United States Patent
Cam-Winget et al.

(10) Patent No.: US 7,400,733 B1
(45) Date of Patent: Jul. 15, 2008

(54) KEY REFRESH AT THE MAC LAYER

(75) Inventors: Nancy Cam-Winget, Mountain View, CA (US); Tao-Fei Samuel Ng, Fremont, CA (US); Kevin Hayes, Mountain View, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 1196 days.

(21) Appl. No.: 10/086,029

(22) Filed: Feb. 27, 2002

(51) Int. Cl.
*H04L 29/08* (2006.01)
*H04L 29/00* (2006.01)

(52) U.S. Cl. .............. 380/283; 380/270; 380/273; 380/278; 713/171; 713/168; 726/2; 726/3

(58) Field of Classification Search .......... None
See application file for complete search history.

(56) References Cited

U.S. PATENT DOCUMENTS

| | | | | |
|---|---|---|---|---|
| 5,706,348 A * | 1/1998 | Gray et al. | ........... | 713/160 |
| 5,937,169 A * | 8/1999 | Connery et al. | ........... | 709/250 |
| 6,049,549 A * | 4/2000 | Ganz et al. | ........... | 370/449 |
| 6,310,886 B1 * | 10/2001 | Barton | ........... | 370/462 |
| 6,393,127 B2 * | 5/2002 | Vogler | ........... | 380/283 |
| 6,469,992 B1 * | 10/2002 | Schieder | ........... | 370/329 |
| 6,909,702 B2 * | 6/2005 | Leung et al. | ........... | 370/278 |
| 6,909,723 B1 * | 6/2005 | Yonge et al. | ........... | 370/447 |
| 6,957,283 B2 * | 10/2005 | Dhir et al. | ........... | 710/10 |
| 2001/0016907 A1 * | 8/2001 | Kang et al. | ........... | 713/152 |
| 2002/0078249 A1 * | 6/2002 | Lu et al. | ........... | 709/310 |
| 2002/0164029 A1 * | 11/2002 | Jiang | ........... | 380/270 |
| 2003/0048905 A1 * | 3/2003 | Gehring et al. | ........... | 380/270 |
| 2004/0059825 A1 * | 3/2004 | Edwards et al. | ........... | 709/230 |
| 2005/0135811 A1 * | 6/2005 | Lee et al. | ........... | 398/139 |
| 2005/0152305 A1 * | 7/2005 | Ji et al. | ........... | 370/328 |
| 2005/0201554 A1 * | 9/2005 | Kramer et al. | ........... | 380/28 |
| 2005/0235159 A1 * | 10/2005 | Anandakumar et al. | ........... | 713/185 |
| 2007/0280176 A1 * | 12/2007 | Silverman et al. | ........... | 370/338 |

* cited by examiner

*Primary Examiner*—Syed A. Zia
(74) *Attorney, Agent, or Firm*—Bever, Hoffman & Harms, LLP; Jeanette S. Harms

(57) ABSTRACT

A method for encrypted communications between a first transceiver and a second transceiver is provided. The method includes sending from a first transceiver to a second transceiver a request to initiate derivation of a new encryption key. The request to initiate a new encryption key derivation includes an exchange threshold indicative of when the new encryption key is to be used to encrypt communication packets.

41 Claims, 4 Drawing Sheets

KEY REFRESH AT THE MAC LAYER

BACKGROUND OF THE INVENTION

1. Field of the Invention

The present invention pertains generally to encrypted communications, and particularly to a mechanism for refreshing a key and indicating when the refreshed key is to be invoked.

2. Description of the Related Art

The market for home networking is developing at a phenomenal rate. Service providers from cable television, telephony and digital subscriber line markets are vying to deliver bundled services such as basic telephone service, Internet access and entertainment directly to the consumer. Collectively these services require a high-bandwidth network that can deliver 30 Mbits/s or even higher rates. The Institute of Electrical and Electronic Engineers (IEEE) 802.11a standard describes a cost-effective, robust, high-performance local-area network (LAN) technology for distributing this multimedia information within the home. Networks that will operate in accordance with standard 802.11a will use the 5-GHz UNII (unlicensed National Information Infrastructure) band and may achieve data rates as high as 54 Mbits/s, which is a significant improvement over other standards-based wireless technology. Other standards include, but are not limited to IEEE 802.11b, Bluetooth (802.15), and HiperLAN.

To provide a level of security, wireless systems that operate in accordance with 802.11a and the other standards allow for encrypted communication. However, depending on the length of the nonce (i.e. a pseudo-random or counter-derived value used with the encryption key to further enhance the encryption), communicating at high data rates may have an undesirable impact on encrypted communication. For example, if the nonce is relatively short, then the lifespan of the maximum security provided by that encryption (also called an entropy or key space) may be exhausted during a communications session spanning hours or even minutes. The key space is a function of how the nonce is derived, how the nonce affects the key from one packet to the next, the number of bits in the nonce, the packet size, and the communications bit rate. When the key space is exhausted, a new encryption key is generally created to provide maximum security for the communication.

FIG. 1 illustrates a diagram of a protocol architecture 100, as described by the Open Systems Interconnection (OSI) model, that is representative of a wireless device that operates in accordance with the IEEE 802.11a standard, which allows for encryption. (Note that other wireless or wired devices can also have a similar architecture.) Architecture 100 defines a networking framework for implementing protocols in seven layers, wherein control passes from one layer to the next. Specifically, a first station begins with an application layer 107 and proceeds to a physical layer 101 (i.e. down the hierarchy). A second station, receiving a transmission from the first station over a (radio) channel, begins with physical layer 101 and proceeds to application layer 107 (i.e. up the hierarchy).

Physical layer 101, which provides the hardware for sending and receiving data on a carrier, conveys the physical properties of the communication medium, electrical properties, and interpretation of the exchanged signals. Data link layer 102 is comprised of two sub-layers: the Media Access Control (MAC) sub-layer 102A and the Logical Link Control (LLC) sub-layer 102B (wherein MAC sub-layer 102A is lower than LLC sub-layer 102B). MAC sub-layer 102A provides the services required to control how a computer on the network gains access to the data as well as permission to transmit the data. LLC sub-layer 102B controls frame synchronization and flow control of the data. Network layer 103 provides the switching and routing services required to successfully transmit data between any two stations in the network. Transport layer 104 provides the services required to ensure complete data transfer, including error detection and recovery. Session layer 105 provides the services required to manage the data connections between stations. Presentation layer 106 provides the translation to allow the data to be transformed into a format that application layer 107 can understand. Finally, Application layer 107 provides an interface between a user and the wireless device. Application layer 107 may include applications such as ftp, email, telephone, and cable service.

The 1999 IEEE 802.11 standard includes encryption as a service in data link layer 102, specifically in MAC sub-layer 102A. However, the 1999 IEEE 802.11 standard omits any specification for how encryption keys are obtained as well as how these keys may be updated. In one embodiment, presentation layer 106 or session layer 105 (for purposes of this discussion, the "higher layer") can be used to establish and manage these encryption keys. This higher layer typically initiates encrypted communication by obtaining a key from a key authentication server (which is generally external to the OSI model) and providing that key to MAC sub-layer 102A.

However, because MAC sub-layer 102A currently does not provide a mechanism to communicate to the higher layer that the key needs to be updated, the higher layer must redundantly store this information, monitor the state of the key (i.e. its location in the key space), and update the key independent of any communication with MAC sub-layer 102A. Moreover, because there is no defined protocol to update the key, the higher layer merely supplants the old key with a new key, thereby causing traffic disruption. Finally, the higher layer does not control communications regarding the data packet granularity (which is provided by MAC sub-layer 102A). Thus, the higher layer is unable to predict when repetition of nonces occurs (also known as collisions), which can undermine security.

Therefore, a need arises for an encryption solution that enhances security by updating the key while minimizing communication disruption when that key is being updated.

SUMMARY OF THE INVENTION

A method for encrypted communications between a first transceiver and a second transceiver is described. The method includes sending from a first transceiver to a second transceiver a request to initiate derivation of a new encryption key. The request to initiate a new encryption key derivation, which is controlled by the MAC sub-layer, includes an exchange threshold indicative of when the new encryption key is to be used to encrypt communication packets.

BRIEF DESCRIPTION OF THE FIGURES

Note that like reference numerals denote similar elements in the figures.

DETAILED DESCRIPTION OF THE FIGURES

Figure 1:
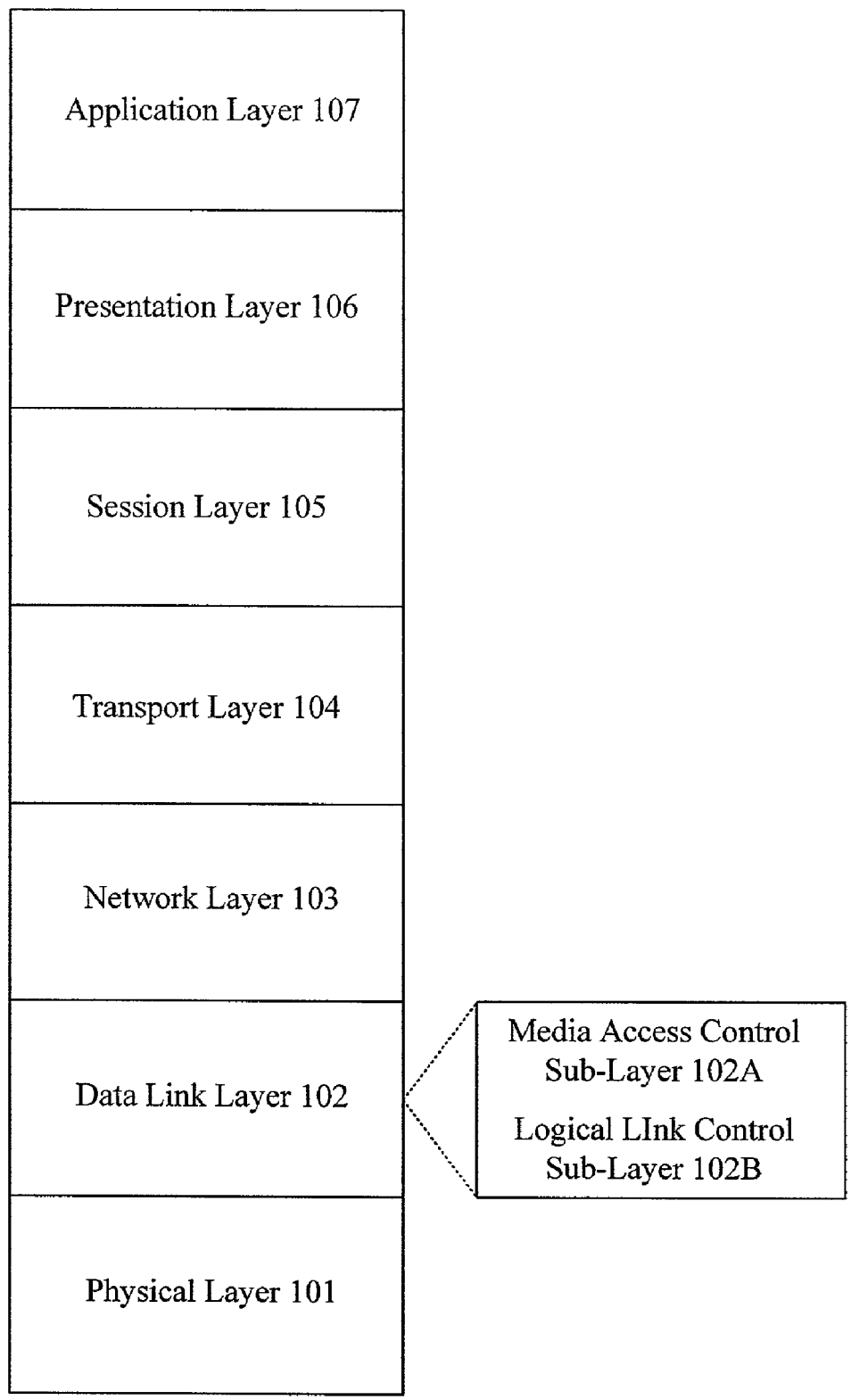
FIG. 1 illustrates a diagram of the protocol architecture of a wireless device.
Figure 2:
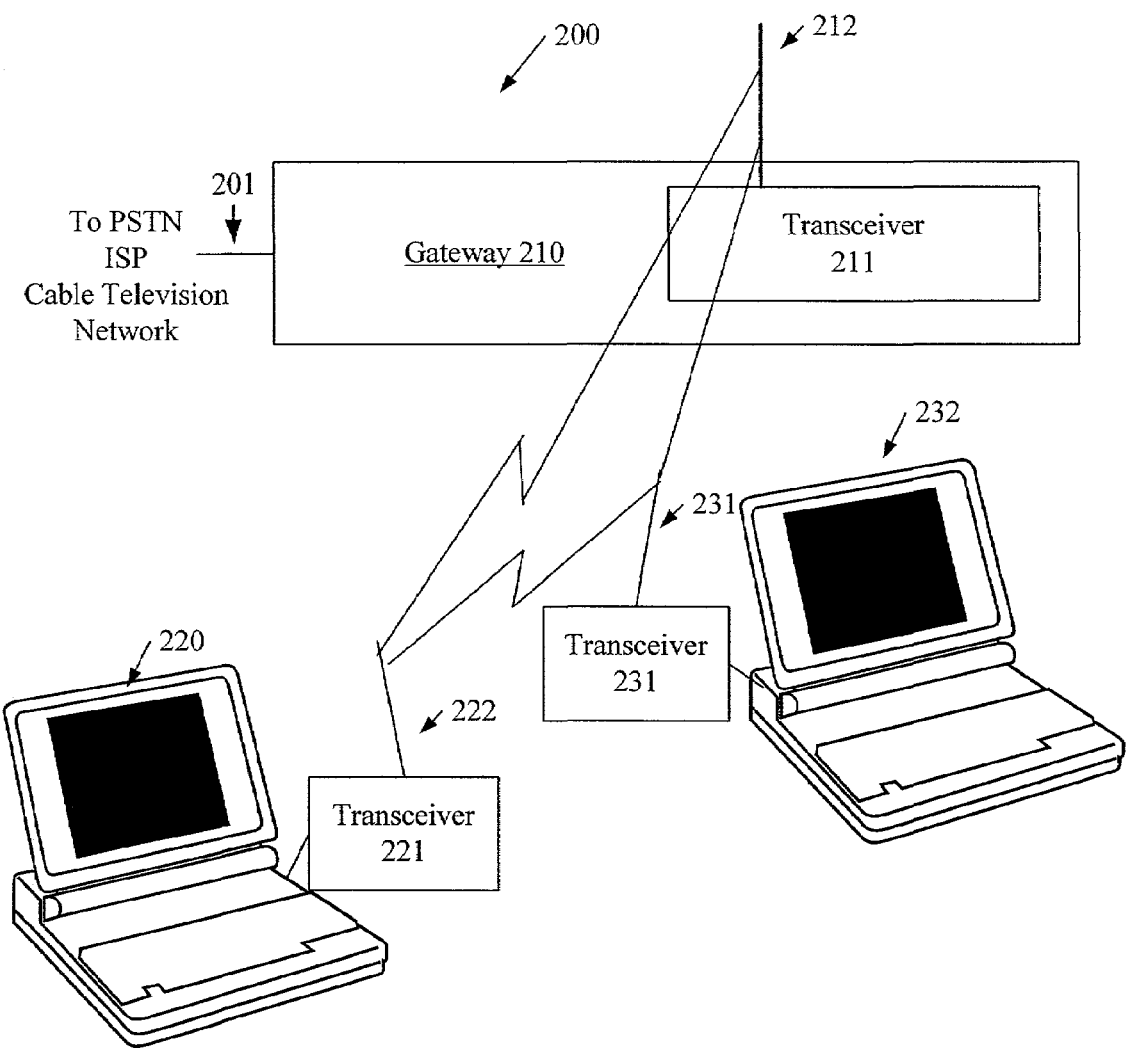
FIG. 2 illustrates a simplified communication system.

FIG. 2 illustrates a communication system 200 that includes a gateway 210 and two devices 220 and 230. In this wireless environment, communication can be established using transceivers (i.e. a combination transmitter/receiver in a single package) and antennas (i.e. means for converting radio-frequency (RF) fields into alternating current (AC) or vice versa). Specifically, gateway 210 includes a transceiver 211 and an antenna 212, device 220 includes a transceiver 221 and an antenna 222, and device 230 includes a transceiver 231 and an antenna 232. According to one embodiment, devices 220 and 230 are computers. However, in other embodiments, devices 220 and 230 could be televisions, personal digital assistants (PDAs), or some other electronic components that require encrypted communications. Note that according to one embodiment, transceivers 211, 221, and 231 communicate in accordance with the IEEE 802.11a standard. However, these transceivers can operate in accordance with other wireless standards in other embodiments.

Transceiver 211 provides transceivers 221 and 231 with a wireless connection to systems that are connected to gateway 210 via a wired network 201. These systems can include, for example, a public switched telephone network (PSTN), a cable television system, an Internet service provider (ISP), or some other communication system. System 200 also allows devices 220 and 230 to communicate directly using transceivers 221 and 231, respectively. During any communication session between two stations (i.e. two of gateway 210, device 220, and device 230), one station could indicate a need to communicate over an encrypted channel.

Figure 3:
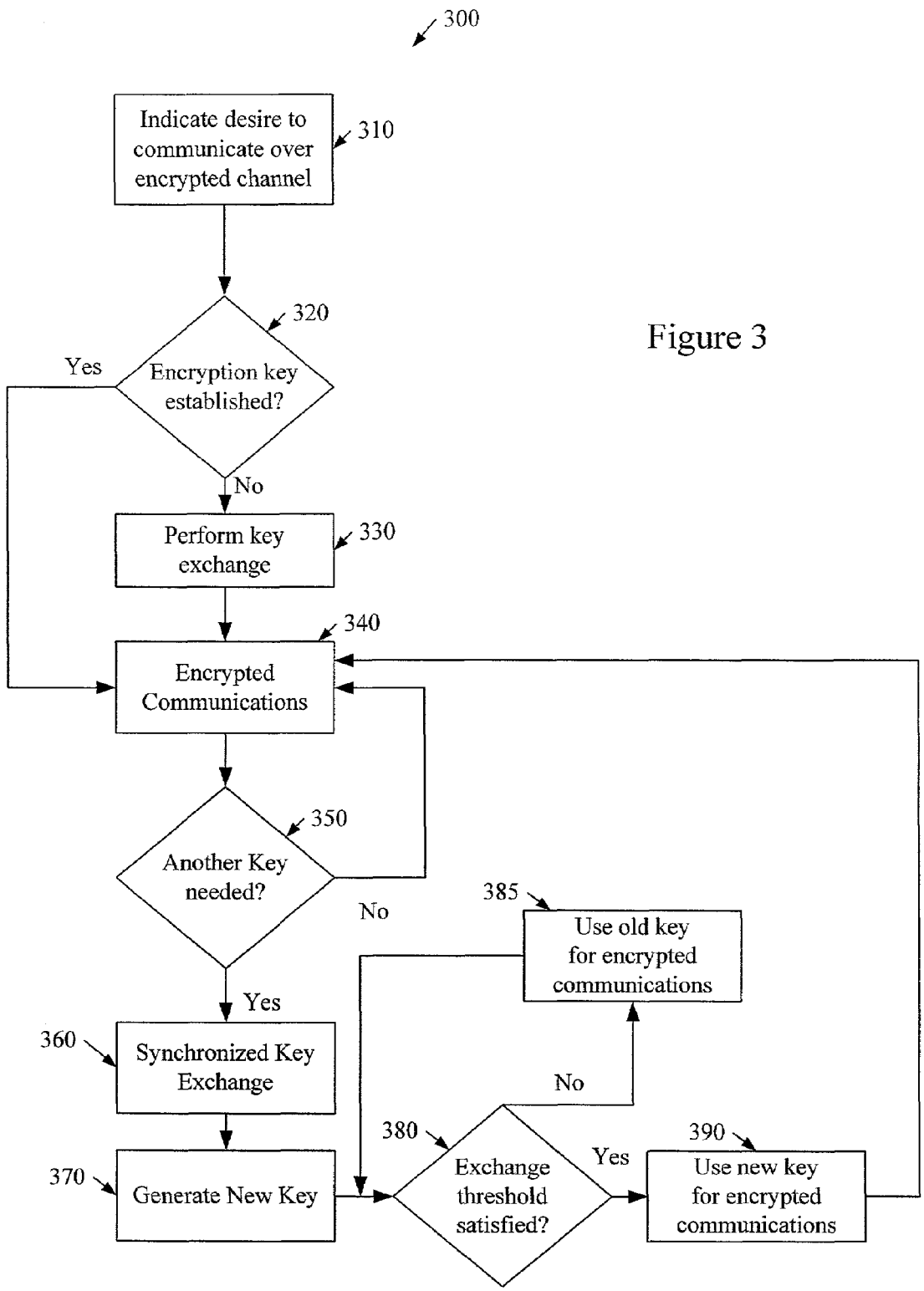
FIG. 3 illustrates one embodiment of a process for establishing an encrypted channel.

FIG. 3 illustrates a process 300 for establishing an encrypted channel between stations (using their transceivers) according to one embodiment of the invention. In step 310, a station can indicate that communication over an encrypted channel is desired. In the current IEEE 802.11 standard, before any communication begins, MAC sub-layer 102A ensures that the user is a valid user through an authentication (i.e. verification of identity or source) exchange (e.g. using a standard 5 message protocol), which is well known in the art.

In accordance with one feature of the invention, MAC sub-layer 102A can control the derivation of a key used for encryption based on key material provided during this authentication exchange. As noted previously, session layer 105 or presentation layer 106 can also generate an encryption key. In this case, MAC sub-layer 102A triggers the encryption key generation and provides overall control of this process. Thus, if an encryption key has not been established, as determined by step 320, then this key can be generated through a key exchange performed by the two stations using their MAC sub-layers 102A in step 330. Once an encryption key is established, encrypted communication can occur in step 340.

For each encrypted communication, there will be a point reached when, due to the number of packets sent, the key space is exhausted. When the key space is exhausted, it is considered catastrophic to continue using the same encryption key. Specifically, using the same combination of encryption key and nonce may allow an adversary or other unwanted interloper (security "hacker") to decipher the communication being conducted between the two stations. Consequently, step 350 determines whether another key is needed because the key space is about to be exhausted. The key space is a function of the nonce, the packet size, and the communication rate. Specifically, the key space can be calculated as follows:

$$\text{Key Space} = \frac{2^{(\text{\# of Bits in the Nonce})} \times \text{Packet Size}}{\text{Communication Rate}} \quad \text{Equation 1}$$

Thus, for a 3 byte nonce (i.e. 24 bits), a packet size of $2^{10}$ bytes, and a communications rate of 8 Mbits/sec, the key space is exhausted every 2,144 seconds (about 36 minutes). Consequently, in this example, step 350 can determine whether something close to 2,144 seconds have elapsed or whether close to $2^{24}$ (about 16 million) packets have been transmitted and received. If so, then another key is needed and a synchronized key exchange can be initiated in step 360.

Of importance, this synchronized key exchange must be initiated sufficiently early to allow 1) for the key exchange to occur and 2) for the new encryption key to be generated before the key space has been exhausted. The key exchange is described as being synchronized because the station that initiates the key exchange sends, during the key exchange, an exchange threshold indicative of when the new encryption key is to be used in encrypting communications. In one embodiment, the synchronized key exchange can also be an authenticated key exchange.

After a synchronized key exchange, the new encryption key is generated in step 370. Step 380 then determines whether the exchange threshold that was provided during the synchronized key exchange has been satisfied. If the exchange threshold has not been satisfied, then the old encryption key is still used for encrypting communications for a predetermined time/#packets in step 385. If the exchange threshold has been satisfied, then the new encryption key is used for encrypting communications in step 390.

Note that key generation and key exchanges can be implemented at any layer that has access to certain information, such as packet count. Of importance, packet counts can change from one layer of the hierarchy to another layer. For example, data link layer 102 (and specifically, MAC sub-layer 102A) may receive a MAC service data unit (MSDU) of 1 frame, i.e. 1000 bytes, from network layer 103. However, MAC sub-layer 102A may partition this MSDU into multiple packets, thereby providing a MAC management protocol data unit (MPDU) to physical layer 101 that includes these multiple packets. Thus, instead of the key being used once (according to network layer 103), the key is actually used multiple times (according to data link layer 102). Therefore, the layer controlling the key generation and key exchanges should have access to this type of information so that an accurate determination of exhaustion of the key space can be calculated. For ease of reference, any layer having this capability is called herein a physical control layer.

Figure 4:
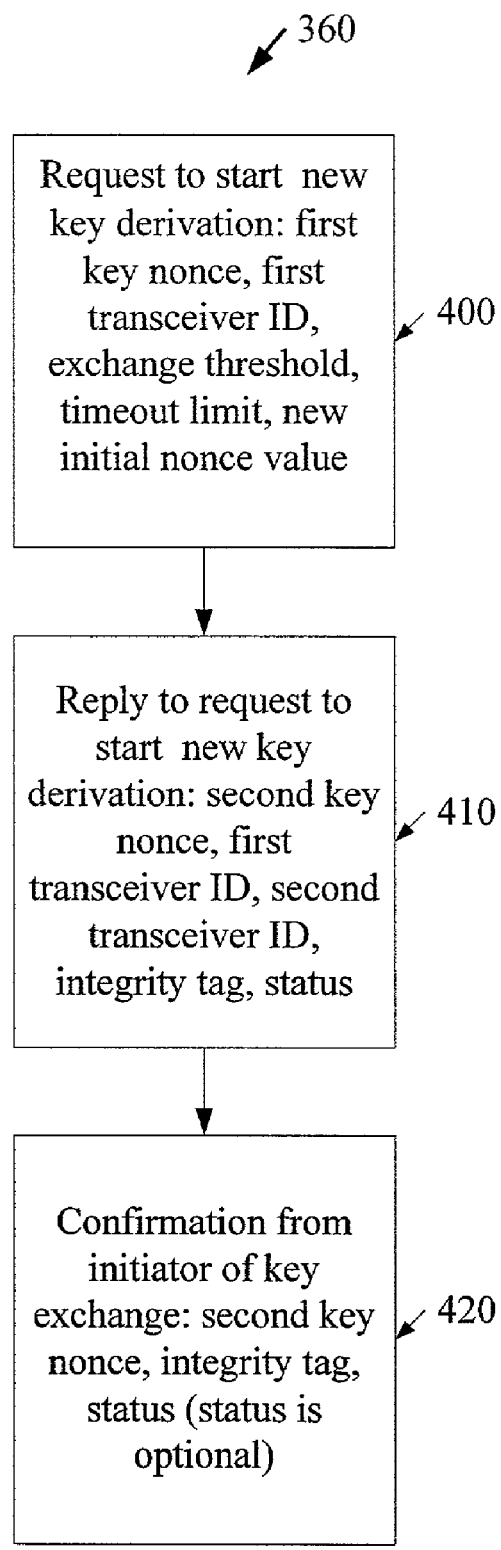
FIG. 4 illustrates one embodiment of an authenticated synchronized key exchange.

FIG. 4 illustrates one embodiment of a synchronized key exchange as provided by step 360 (FIG. 3). In this exchange, a first transceiver sends a request to initiate derivation of a new encryption key to a second transceiver in step 400. The request to initiate a new encryption key derivation can include first key material that is used (along with second key material received from the second transceiver, described in step 410) to derive a new encryption key. The request can also include an exchange threshold indicative of when the new encryption key is to be used. Depending upon the particular embodiment, the exchange threshold can be a time, a nonce value, or a number of packets that have been sent using the current encryption key that is currently being used for communication. If the synchronized key exchange is authenticated, then the request can also include a first transceiver identifier that confirms the identity of the first transceiver to the second transceiver.

In one embodiment, the request can further include a timeout limit that indicates when the encrypted communication is to be either aborted or retried. This timeout can take into consideration station failures and/or dropped packets. For example, assuming that N packets must be sent to change a key, if the key exchange was attempted N packets before the key space was exhausted, but the old key is still in use after N packets, then the stations can determine whether disengaging is appropriate to ensure maximum security of their communication. In another example, if the key exchange was attempted 3N packets before the key space was exhausted, but the old key is still in use after N packets, then the stations can determine that a retry is appropriate.

The request can also include a new initial nonce value that is used to extend the encryption key and is used in combination with the encryption key to encrypt the packets. In one embodiment, the initial nonce value can be a counter and the counter is used to encrypt each packet. After the counter value is used, the counter can be incremented. According to an alternative embodiment, the counter can be decremented. According to yet another embodiment, the counter can be incremented first, and then the value in the counter after incrementing is used for encryption.

In response to the request from the first transceiver in step 400, the second transceiver replies with second key material in step 410. The new encryption key can be derived using any suitably secure cryptographic algorithm that generates a pseudorandom number, wherein the inputs to the algorithm include the first and second key materials (provided by the first and second transceivers, respectively).

If the synchronized key exchange is authenticated, then the second transceiver can also send to the first transceiver a second transceiver's identifier that confirms the identity of the second transceiver to the first transceiver. Note that the second transceiver identifier can include the first transceiver identifier and an integrity tag. The integrity tag (also called the Message Authentication Code) uses a message authentication algorithm protecting the transceiver identifiers and message contents to ensure the exchange is active and prevent adversaries from forging those messages.

In one embodiment of step 410, the second transceiver can also send to the first transceiver a status message that indicates the feasibility (as determined by the second transceiver) of being able to commence using the new encryption key at the second transceiver in accordance with the exchange threshold.

In step 420, the first transceiver replies to the second transceiver with a confirmation. This confirmation can include one or more of the following: the second key material, the integrity tag, and the status indication received from the second transceiver.

Methods and apparatus for refreshing an encryption key have been described with reference to various embodiments. Note that these embodiments are illustrative rather than restrictive. For example, multiple steps have been described in an order helpful in understanding the invention. However, the order of these steps can be modified or perhaps the steps are not even order dependent. Accordingly, it is intended that the scope of the encryption key refresh invention be defined only by the following Claims and their equivalents.

The invention claimed is:

1. A method for encrypted communications between a first transceiver and a second transceiver, the method comprising:
sending from a first transceiver to a second transceiver a request to initiate derivation of a new encryption key, the request to initiate a new encryption key derivation being controlled by a MAC sub-layer and including an exchange threshold indicative of when the new encryption key is to be used to encrypt communication packets.

2. The method of claim 1, wherein the exchange threshold is a time.

3. The method of claim 1, wherein the exchange threshold is a counter value.

4. The method of claim 1, wherein the exchange threshold is a number of packets.

5. The method of claim 1, wherein the exchange threshold is at least one of a time, a counter value, and a number of packets.

6. The method of claim 1, wherein the request to initiate derivation of the new encryption key includes a timeout limit that indicates that a session is to be at least one of aborted or retried when the timeout limit is satisfied.

7. The method of claim 1, wherein the request to initiate derivation of the new encryption key is sent from the first transceiver to the second transceiver and the new encryption key is to be generated at the second transceiver, in response to the request, before a key space of an old nonce value has been exhausted.

8. The method of claim 1, wherein the request to initiate derivation of the new encryption key includes a first nonce needed to derive the new encryption key.

9. The method of claim 8, further comprising:
sending from the second transceiver to the first transceiver, in response to the request to initiate derivation of the new encryption key, a second nonce needed to derive the new encryption key.

10. The method of claim 1, wherein the request to initiate derivation of the new encryption key includes a first transceiver authentication indication that authenticates the first transceiver to the second transceiver.

11. The method of claim 10, further comprising sending from the second transceiver to the first transceiver, in response to the request to initiate derivation of the new encryption key, a second transceiver authentication indication which authenticates the second transceiver to the first transceiver.

12. The method of claim 1, wherein the request to initiate derivation of the new encryption key includes a new initial nonce value that is used along with the new encryption key for encryption.

13. The method of claim 12, further comprising:
sending from the second transceiver, in response to the request to initiate derivation of the new encryption key, a status indicator indicative of the second transceiver's determination of the feasibility of being able to commence using the new encryption key at the second transceiver in accordance with the exchange threshold.

14. The method of claim 1, further comprising:
determining whether the new encryption key needs to be derived; and
wherein sending the request to initiate derivation of the new encryption key is based upon the determination of whether the new encryption key needs to be derived.

15. The method of claim 1, further comprising:
generating the new encryption key at the first transceiver and the second transceiver;
determining at least one of the first transceiver and the second transceiver whether the exchange threshold has been satisfied; and encrypting at least one of the first transceiver and the second transceiver using the new encryption key when the exchange threshold has been satisfied.

16. The method of claim 15 further comprising:
continuing communication between the first transceiver and the second transceiver using for encryption an old encryption key generated before the new encryption key when the exchange threshold has still not been satisfied.

17. The method of claim 16 wherein encrypting using the new encryption key occurs without disrupting communication between the first transceiver and the second transceiver.

18. The method of claim 1, wherein the request to initiate derivation of the new encryption key includes a first nonce needed to derive the new encryption key, the method further comprising:
sending from the second transceiver to the first transceiver, in response to the request to initiate derivation of the new encryption key, a second nonce needed to derive the new encryption key.

19. The method of claim 18, further comprising:
generating at least one of the first transceiver and the second transceiver the new encryption key;
determining at least one of the first transceiver and the second transceiver whether the exchange threshold has been satisfied; and
encrypting at least one of the first transceiver and the second transceiver using the new encryption key when the exchange threshold has been satisfied.

20. The method of claim 19, wherein the request to initiate derivation of the new encryption key includes a new initial nonce value and encrypting includes using the initial nonce value and the new encryption key for encryption, the method further comprising:
determining whether the new encryption key needs to be derived; and
wherein sending the request to initiate derivation of the new encryption key is based upon the determination of whether the new encryption key needs to be derived.

21. The method of claim 20, the method comprising:
sending from the first receiver to the second transceiver a first transceiver authentication indication that authenticates the first transceiver to the second transceiver; and
sending from the second transceiver to the first transceiver a second transceiver authentication indication that authenticates the second transceiver to the first transceiver.

22. The method of claim 21, further comprising sending from the first transceiver to the second transceiver the second nonce.

23. The method of claim 22 further comprising:
continuing communication between the first transceiver and the second transceiver using an old encryption key generated before the new encryption key when the exchange threshold has still not been satisfied.

24. The method of claim 23 wherein encrypting using the new encryption key occurs without disrupting communication between the first transceiver and the second transceiver.

25. The method of claim 24, wherein the request to initiate derivation of the new encryption key includes a timeout limit that indicates that a communication is one of aborted and retried when the timeout limit is satisfied.

26. A first transceiver that is to conduct encrypted communications with a second transceiver, the first transceiver comprising:
a physical control layer that sends to the second transceiver a request to initiate derivation of a new encryption key, the request to initiate a new encryption key derivation being controlled by a MAC sub-layer and including an exchange threshold indicative of when the new encryption key is to be used to encrypt communication packets.

27. The first transceiver of claim 26, wherein the exchange threshold is a number of packets.

28. The first transceiver of claim 26, wherein the request includes a first transceiver identifier that authenticates the first transceiver to the second transceiver.

29. The first transceiver of claim 26, wherein the request to initiate derivation of the new encryption key includes a timeout limit that indicates that a session is to be at least one of aborted or retried when the timeout limit is satisfied.

30. The first transceiver of claim 26, wherein the request to initiate derivation of the new encryption key includes a first nonce needed to derive the new encryption key.

31. The first transceiver of claim 26, wherein the request to initiate derivation of the new encryption key includes a first transceiver authentication indication that authenticates the first transceiver to the second transceiver.

32. The first transceiver of claim 26, wherein the request to initiate derivation of the new encryption key includes a new initial nonce value that is used in combination with the new encryption key for encryption.

33. The first transceiver of claim 26, wherein the physical control layer determines whether the new encryption key needs to be derived before sending the request to initiate derivation of the new encryption key; and
wherein sending the request to initiate derivation of the new encryption key is based upon the determination of whether the new encryption key needs to be derived.

34. The first transceiver of claim 26, wherein the physical layer receives a second nonce from the second transceiver, generates the new encryption key, determines whether the exchange threshold has been satisfied, and encrypts using the new encryption key when the exchange threshold has been satisfied.

35. The first transceiver of claim 34 wherein the physical control layer continues using for encryption an old encryption key generated before the new encryption key when the exchange threshold has still not been satisfied.

36. The first transceiver of claim 26, wherein the physical control layer sends the request early enough so that the new encryption key is to be generated at the second transceiver, in response to the request, before a key space of an old nonce value has been exhausted.

37. A first transceiver that is to conduct encrypted communications with a second transceiver, the first transceiver comprising:
a physical control layer that receives from the second transceiver a request to initiate derivation of a new encryption key, the request to initiate a new encryption key derivation being controlled by a MAC sub-layer and including an exchange threshold indicative of when the new encryption key is to be used to encrypt communication packets, and a first nonce needed to derive the new encryption key.

38. The first transceiver of claim 37, wherein the physical control layer sends to the second transceiver, in response to the request to initiate derivation of the new encryption key, a second nonce.

39. The first transceiver of claim 37, wherein the physical control layer sends to the second transceiver, in response to the request to initiate derivation of the new encryption key, a status indication indicative of the first transceiver's determination of the feasibility of being able to commence using the new encryption key at the first transceiver in accordance with the exchange threshold.

40. The first transceiver of claim 37, wherein the physical control layer generates the new encryption key, determines whether the exchange threshold has been satisfied, and encrypts using the new encryption key when the exchange threshold has been satisfied.

41. The first transceiver of claim 39, wherein the physical control layer continues communication between the first transceiver and the second transceiver using for encryption an old encryption key generated before the new encryption key when the exchange threshold has still not been satisfied.

* * * * *